(12) United States Patent
Skinner et al.

(10) Patent No.: US 10,677,451 B2
(45) Date of Patent: Jun. 9, 2020

(54) DIRECT STEAM GENERATION, ELECTRICAL POWER GENERATOR, APPARATUS AND METHOD

(71) Applicant: XDI Holdings, LLC, Bedford, NH (US)

(72) Inventors: Raymond Clifford David Skinner, Coral Springs, FL (US); Alan Craig Reynolds, Novi, MI (US)

(73) Assignee: XDI Holdings, LLC, Bedford, NH (US)

( * ) Notice: Subject to any disclaimer, the term of this patent is extended or adjusted under 35 U.S.C. 154(b) by 65 days.

(21) Appl. No.: 15/767,871

(22) PCT Filed: Oct. 12, 2016

(86) PCT No.: PCT/US2016/056646
§ 371 (c)(1),
(2) Date: Apr. 12, 2018

(87) PCT Pub. No.: WO2017/066325
PCT Pub. Date: Apr. 20, 2017

(65) Prior Publication Data
US 2018/0299119 A1 Oct. 18, 2018

Related U.S. Application Data

(60) Provisional application No. 62/240,445, filed on Oct. 12, 2015.

(51) Int. Cl.
*F22B 1/18* (2006.01)
*F01K 23/08* (2006.01)
(Continued)

(52) U.S. Cl.
CPC ............ *F22B 1/1807* (2013.01); *D21C 11/14* (2013.01); *F01K 9/00* (2013.01); *F01K 13/006* (2013.01);
(Continued)

(58) Field of Classification Search
CPC .. F22B 1/1807; F22B 3/02; F22B 3/08; F01K 23/08; F01K 23/06; F01K 25/06;
(Continued)

(56) References Cited

U.S. PATENT DOCUMENTS 3,118,429 A    1/1964  Hochmuth
3,194,015 A *  7/1965  Pacault .................. F01K 23/06
                                                          60/39.182

(Continued)

*Primary Examiner* — Hoang M Nguyen
(74) *Attorney, Agent, or Firm* — Dykema Gossett PLLC

(57) ABSTRACT

Embodiments of the present disclosure include a system, method, and apparatus comprising a direct steam generator configured to generate saturated steam or superheated steam and combustion exhaust constituents. A CONVAPORATOR™ Unit (CU) can be fluidly coupled to the direct steam generator. The CU can be configured to route the saturated steam or superheated steam and combustion exhaust constituents through a condenser portion of the CU via a condenser side steam conduit and can be configured to condense the super-heated steam or saturated steam to form a condensate. A separation tank and water return system can be fluidly coupled to a condenser side condensate conduit of the condenser portion of the CU. The separation tank and water return system can be configured to separate the combustion exhaust constituents from the condensate. An evaporator portion of the CU can be fluidly coupled with the separation tank and water return system via an evaporator side condensate conduit. The evaporator portion can be configured to evaporate the condensate from the separation tank and water return system via heat transfer between the condenser portion and evaporator portion to form steam. A (Continued)

turbine can be fluidly coupled with the evaporator portion of the CU via an evaporator side steam conduit.

17 Claims, 1 Drawing Sheet

(51) Int. Cl.
- *F01K 23/06* (2006.01)
- *F01K 25/06* (2006.01)
- *D21C 11/14* (2006.01)
- *F01K 9/00* (2006.01)
- *F01K 13/00* (2006.01)
- *F01K 21/04* (2006.01)
- *F22B 3/02* (2006.01)
- *F22B 3/08* (2006.01)

(52) U.S. Cl.
CPC .............. *F01K 21/04* (2013.01); *F01K 23/06* (2013.01); *F01K 23/08* (2013.01); *F01K 25/06* (2013.01); *F22B 3/02* (2013.01); *F22B 3/08* (2013.01)

(58) Field of Classification Search
CPC .......... F01K 9/00; F01K 13/006; F01K 21/04; D21C 11/14

USPC ............. 60/39.182, 649, 673, 651, 655, 671
See application file for complete search history.

(56) References Cited

U.S. PATENT DOCUMENTS

| | | | |
|---|---|---|---|
| 4,028,884 A | 6/1977 | Martz et al. | |
| 4,330,038 A | 5/1982 | Soukup et al. | |
| 4,498,542 A | 2/1985 | Eisenhawer et al. | |
| 7,581,395 B2 * | 9/2009 | Takeuchi | F22D 1/36 60/653 |
| 8,028,527 B2 * | 10/2011 | Vidmar | B01D 5/0039 60/649 |
| 8,596,066 B2 * | 12/2013 | Zimron | F01K 23/04 60/641.2 |
| 8,783,035 B2 * | 7/2014 | Milam | F01K 25/08 60/651 |
| 8,850,814 B2 * | 10/2014 | Kaplan | F01K 23/04 60/618 |
| 2015/0052906 A1 * | 2/2015 | Kehmna | F01K 7/22 60/783 |
| 2016/0348895 A1 | 12/2016 | Juranitch | |

* cited by examiner

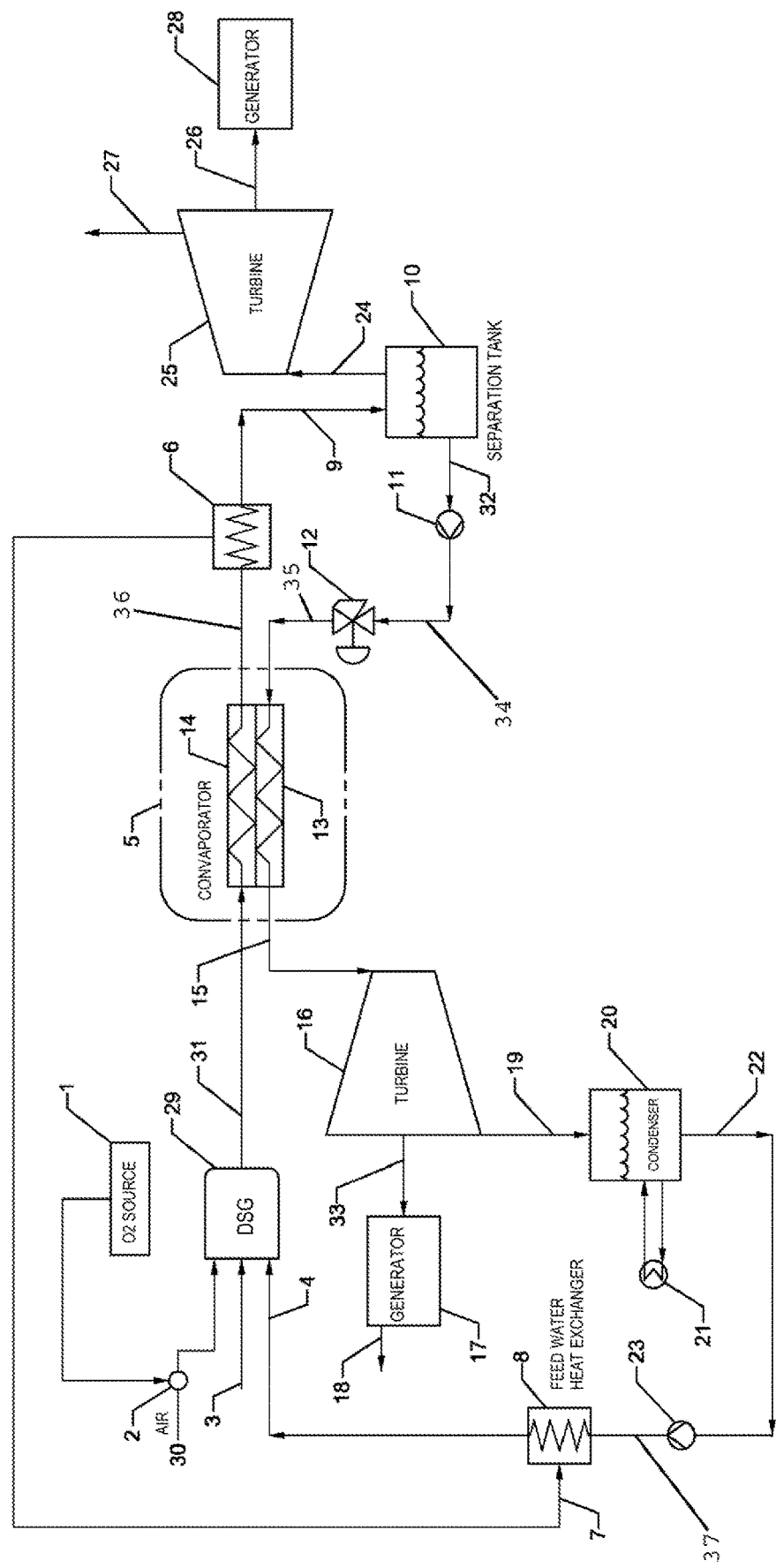

DIRECT STEAM GENERATION, ELECTRICAL POWER GENERATOR, APPARATUS AND METHOD

FIELD OF THE INVENTION

Embodiments of the present disclosure relate generally to a method, apparatus and system for the generation of electrical power from a Direct Steam Generator (DSG) and a CONVAPORATOR™ Unit (CU).

DESCRIPTION OF THE RELATED ART

Nuclear Steam Generators, Once Through Steam Generators, Drum Boilers, and Brayton Cycle turbines all are commonly used to generate electrical power. However, direct steam generators have not found acceptance in any significant applications despite their inherent higher efficiency because they produce a multi-phase flow where the steam product is mixed with exhaust constituents. Steam turbine blades in the power generator and the steam condenser can be adversely affected by this multi-constituent flow. This problem can be significant in subcritical steam pressure systems and super critical steam pressure systems where DSGs are fully capable of operating. One of the results of this multi-constituent problem is that no existing large scale DSG based power generation system is known to be currently in production.

SUMMARY OF THE INVENTION

Embodiments of the present disclosure include a system, method, and apparatus comprising a direct steam generator configured to generate saturated steam or superheated steam and combustion exhaust constituents. A CONVAPORATOR Unit (CU) can be fluidly coupled to the direct steam generator. The CU can be configured to route the saturated steam or superheated steam and combustion exhaust constituents through a condenser portion of the CU via a condenser side steam conduit and can be configured to condense the super-heated steam or saturated steam to form a condensate. A separation tank and water return system can be fluidly coupled to a condenser side condensate conduit of the condenser portion of the CU. The separation tank and water return system can be configured to separate the combustion exhaust constituents from the condensate. An evaporator portion of the CU can be fluidly coupled with the separation tank and water return system via an evaporator side condensate conduit. The evaporator portion can be configured to evaporate the condensate from the separation tank and water return system via heat transfer between the condenser portion and evaporator portion to form steam. A turbine can be fluidly coupled with the evaporator portion of the CU via an evaporator side steam conduit.

Embodiments of the present disclosure include a system, method, and apparatus comprising a direct steam generator configured to generate saturated steam or superheated steam and combustion exhaust constituents. A CONVAPORATOR Unit (CU) can be fluidly coupled to the direct steam generator. The CU can be configured to route the saturated steam or superheated steam and combustion exhaust constituents through a condenser portion of the CU via a condenser side steam conduit and can be configured to condense the super-heated steam or saturated steam to form a condensate. A separation tank and water return system can be fluidly coupled to a condenser side condensate conduit of the condenser portion of the CU. The separation tank and water return system can be configured to separate the combustion exhaust constituents from the condensate. An evaporator portion of the CONVAPORATOR unit can be fluidly coupled with the separation tank and water return system via an evaporator side condensate conduit. The evaporator portion can be configured to evaporate the condensate from the separation tank and water return system via heat transfer between the condenser portion and evaporator portion to form steam. A turbine can be fluidly coupled with the evaporator portion of the CU via an evaporator side steam conduit. An electrical generator can be configured to generate electricity from an output of the turbine.

Embodiments of the present disclosure include a system, method, and apparatus comprising a direct steam generator configured to generate saturated steam or superheated steam and combustion exhaust constituents. A CONVAPORATOR Unit (CU) can be fluidly coupled to the direct steam generator. The CU can be configured to route the saturated steam or superheated steam and combustion exhaust constituents through a condenser portion of the CU via a condenser side steam conduit and can be configured to condense the super-heated steam or saturated steam to form a condensate. A separation tank and water return system can be fluidly coupled to a condenser side condensate conduit of the condenser portion of the CU. The separation tank and water return system can be configured to separate the combustion exhaust constituents from the condensate. An evaporator portion of the CONVAPORATOR unit can be fluidly coupled with the separation tank and water return system via an evaporator side condensate conduit. The evaporator portion can be configured to evaporate the condensate from the separation tank and water return system via heat transfer between the condenser portion and evaporator portion to form steam. A turbine can be fluidly coupled with the evaporator portion of the CU via an evaporator side steam conduit. An electrical generator can be configured to generate electricity from an output of the turbine. A water return system can be configured to condense spent steam from the turbine into water and provide the water to the direct steam generator.

BRIEF DESCRIPTION OF THE DRAWING

FIG. 1 depicts a Direct Steam Generation system in accordance with embodiments of the present disclosure.

DETAILED DESCRIPTION

Direct Steam Generators (DSG) are known to produce steam in a very efficient manner. Heat from the combusted fuel can be transferred directly into the produced steam. In a conventional Once Through Steam Generator (OTSG) or Drum Boiler the steam is generated by transferring heat energy through a tube or thermal wall element. These thermal barriers reduce the system's efficiency.

DSGs have not found acceptance in any significant applications despite their inherent higher efficiency because they produce a multi-phase flow where the steam product is mixed with exhaust constituents. Steam turbine blades in the power generator and the steam condenser can be adversely affected by this multi-constituent flow. This problem can be significant in subcritical steam pressure systems and super critical steam pressure systems where DSGs are fully capable of operating. One of the results of this multi-constituent problem is that no existing large scale DSG based power generation system is known to be currently in production.

The CONVAPORATOR Unit (CU) (also referred to as a close coupled heat exchanger) is described in greater detail in U.S. patent application Ser. No. 15/166,109, filed 26 May 2016 which is hereby incorporated by reference in its entirety as though fully set forth herein. In an example, the CU is a close coupled heat exchanger that is optimized for heavy oil recovery, which can remove the gaseous exhaust constituents from the steam product of the DSG. This now allows the higher efficiency of the DSG to be exploited in the following method and apparatus.

Embodiments of the present disclosure can separate the generated process steam produced by a DSG 29 from its exhaust gas combustion constituents. Oxygen from an Oxygen generator 1, air 30, or oxygen enriched air 2 can be used for combustion in the DSG 29. When high levels of oxygen are used, the method and system will gain efficiency and more easily isolate the exhaust constituents generated by the DSG 29. Due to the lack of N2, when highly oxygen enriched air is used for combustion, the NOx production can also be minimized or eliminated without the use of after treatments. A fuel provided via a fuel conduit 3 can be injected into the DSG 29 and can be combusted within the DSG 29. The fuel provided via fuel conduit 3 could be any carbonaceous material that can be oxidized, but a preferred fuel can be Natural Gas. In some embodiments, process return feedwater can be injected at return feedwater conduit 4. In some embodiments, additional feedwater can be provided to the direct steam generator via return feedwater conduit 4 to supplement the return feedwater. Process steam and exhaust constituents can be expelled in saturated steam conduit 31. If dirty process water is used in the feedwater system, an optional particulate cleaning module can be added to saturated steam conduit 31.

The CONVAPORATOR Unit (CU) 5, which is also known as a close coupled heat exchanger, is described in greater detail in U.S. patent application Ser. No. 15/166,109, filed 26 May 2016, which is hereby incorporated by reference in its entirety as though fully set forth herein. In the upper loop 14 (also referred to as condenser side or condenser portion) of the CU 5, the process steam and exhaust constituents can be cooled and in some cases the steam can be condensed or partially condensed. The balance of the steam can be further cooled and condensed in a return feedwater heat exchanger 6, which can be fluidly coupled with the CU 5 via a condenser side condensate conduit 36 and can provide condensed and/or partially condensed steam to a feedwater heat exchanger 8 via a return conduit 7. Feedwater heating is only one of many heat extraction loops that could be employed downstream of the upper loop 14. Conduit 9 can transmit a mixture of condensed water and exhaust constituents to separation tank 10 from the CU 5 and/or the return feedwater heat exchanger 6. The output of separation tank 10 can primarily be the exhaust constituents in exhaust constituent conduit 24 which then can be used to generate additional power in turbine or expander 25, which turns generator 28 through coupling 26. Final process water can be carried by process vapor pressure from the separation tank 10 and can be recovered at turbine outlet 27 along with the separated exhaust constituents.

From Separation Tank 10, condensed water in condensed water conduit 32 can be pumped via pump 11 through control valve 12 via a pump conduit 34 and through the evaporation loop 13 (also referred to as evaporator side or evaporator portion) of the CU 5 via an evaporator side condensate conduit 35. Process steam that is free of exhaust constituents is transferred from the evaporation loop 13 by evaporator side steam conduit 15 to power extraction turbine 16. An optional superheater could be employed at evaporator side steam conduit 15 if desired (not shown for clarity) to improve a quality of the steam provided by the CU. The power extraction turbine 16 can be coupled by power turbine coupling 33 to electrical generator 17, which can generate electricity 18. Embodiments of the present disclosure can include a water return system that is configured to condense spent steam into water and return the water to the direct steam generator 29. In some embodiments, the water return system can include a feedwater heat exchanger 8, as further discussed below. In an example, spent steam can be transferred through spent steam conduit 19 to spent steam condenser 20, which can employ a cooling system 21. Condensed feedwater in condensed feedwater conduit 22 can be pumped by pump 23 through feedwater heat exchanger 8, which can be serviced by the heated water in conduit 7, and can be fluidly coupled with the pump 23 via a pump conduit 37. The return conduit to heat exchanger 6 is not shown for clarity.

When the described apparatus and system is operated on oxygen enriched air and natural gas to generate super critical steam pressures, the system and apparatus can produce electricity at efficiencies greater than 50% of the Natural Gas's energy content and greater than 40% efficiency when all losses including the oxygen generator are considered. This level of efficiency is significant when it is understood that the exhaust gasses are minimized and separated in this apparatus and system. The exhaust gasses can also have minimal NOx content without the use of after treatments.

Embodiments are described herein of various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment", or the like, means that a particular feature, structure, or characteristic described in connection with the embodiment(s) is included in at least one embodiment. Thus, appearances of the phrases "in various embodiments," "in some embodiments," "in one embodiment," or "in an embodiment," or the like, in places throughout the specification, are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It will be appreciated that the terms "proximal" and "distal" may be used throughout the specification with reference to a clinician manipulating one end of an instrument used to treat a patient. The term "proximal" refers to the portion of the instrument closest to the clinician and the term "distal" refers to the portion located furthest from the clinician. It will be further appreciated that for conciseness and clarity, spatial terms such as "vertical," "horizontal," "up," and "down" may be used herein with respect to the illustrated embodiments. However, may be used in many orientations and positions, and these terms are not intended to be limiting and absolute.

Although at least one embodiment for Direct Steam Generation Electrical Power Generation, apparatus and method has been described above with a certain degree of particularity, those skilled in the art could make numerous alterations to the disclosed embodiments without departing from the spirit or scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the devices. Joinder references (e.g., affixed, attached, coupled, connected, and the like) are to be construed broadly and can include intermediate members between a connection of elements and relative movement between elements. As such, joinder references do not necessarily infer that two elements are directly connected and in fixed relationship to each other. It is intended that all matter contained in the above description or shown in the accompanying drawings shall be interpreted as illustrative only and not limiting. Changes in detail or structure can be made without departing from the spirit of the disclosure as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The invention claimed is:

1. A system, comprising:
a direct steam generator configured to generate saturated steam or superheated steam and combustion exhaust constituents;
a convaporator unit (CU) fluidly coupled to the direct steam generator, wherein the CU is configured to route the saturated steam or superheated steam and combustion exhaust constituents through a condenser portion of the CU via a condenser side steam conduit, and wherein the CU is configured to condense the superheated steam or saturated steam to form a condensate;
an evaporator portion of the CU fluidly coupled with the condenser side steam conduit via an evaporator side condensate conduit;
a turbine fluidly coupled with the evaporator portion of the CU via an evaporator side steam conduit;
a spent steam condenser fluidly coupled with the turbine via a spent steam conduit, the spent steam condenser being coupled with a return feedwater conduit;
a feedwater heat exchanger fluidly coupled with the return feedwater conduit; and
a return feedwater heat exchanger fluidly coupled with the condenser portion of the CU via the condenser side condensate conduit, wherein the return feedwater heat exchanger is configured to provide condensed steam to the feedwater heat exchanger via a return conduit.

2. The system of claim 1, wherein the turbine is coupled with an electrical generator via a coupling.

3. The system of claim 2, wherein the electrical generator is configured to generate power from an output of the turbine.

4. The system of claim 1, wherein the spent steam condenser is configured to condense spent steam from the output of the turbine.

5. The system of claim 4, wherein the feedwater heat exchanger is configured to heat a condensate generated by the spent steam condenser.

6. The system of claim 1, further comprising a superheater in fluid communication with the evaporator portion of the CU via an evaporator side steam conduit.

7. The system of claim 1, further comprising an oxygen generator fluidly coupled to the direct steam generator via an air conduit.

8. A system, comprising:
a direct steam generator configured to generate saturated steam or superheated steam and combustion exhaust constituents;
a convaporator unit (CU) fluidly coupled to the direct steam generator, wherein the CU is configured to route the saturated steam or superheated steam and combustion exhaust constituents through a condenser portion of the CU via a condenser side steam conduit, and wherein the CU is configured to condense the superheated steam or saturated steam to form a condensate;
an evaporator portion of the CU fluidly coupled with the condenser side steam conduit;
a turbine fluidly coupled with the evaporator portion of the CU via an evaporator side steam conduit;
an electrical generator configured to generate electricity from an output of the turbine;
a water return system configured to condense spent steam from the turbine into water and provide the water to the direct steam generator; and
a feedwater heating system configured to heat the return water provided to the direct steam generator with the condensate from the CU.

9. The system of claim 8, further comprising a feedwater conduit fluidly coupled with the direct steam generator.

10. The system of claim 8, further comprising a return feedwater heat exchanger fluidly coupled with the condenser portion of the CU via the condenser side condensate conduit.

11. The system of claim 10, wherein the return feedwater heat exchanger is configured to heat feedwater flowing through the feedwater conduit.

12. The system of claim 8, further comprising a second turbine fluidly coupled with the separation tank and water return system via an exhaust constituent conduit, wherein the second turbine is coupled with a second electrical generator and is configured to generate electricity.

13. A system, comprising:
a direct steam generator configured to generate saturated steam or superheated steam and combustion exhaust constituents;
a convaporator unit (CU) fluidly coupled to the direct steam generator, wherein the CU is configured to route the saturated steam or superheated steam and combustion exhaust constituents through a condenser portion of the CU via a condenser side steam conduit, and wherein the CU is configured to condense the superheated steam or saturated steam to form a condensate;

a separation tank and water return system fluidly coupled to a condenser side condensate conduit of the condenser portion of the CU, wherein the separation tank and water return system is configured to separate the combustion exhaust constituents from the condensate;

an evaporator portion of the CU fluidly coupled with the separation tank and water return system via an evaporator side condensate conduit; wherein the evaporator portion is configured to evaporate the condensate from the separation tank and water return system via heat transfer between the condenser portion and evaporator portion to form steam;

a turbine fluidly coupled with the evaporator portion of the CU via an evaporator side steam conduit;

an electrical generator configured to generate electricity from an output of the turbine;

a water return system configured to condense spent steam from the turbine into water and provide the water to the direct steam generator; and a feedwater heating system configured to heat the return water provided to the direct steam generator with the condensate from the CU.

14. The system of claim 13, wherein the water return system includes a spent steam condenser fluidly coupled with the turbine via a spent steam conduit 19.

15. The system of claim 14, wherein the spent steam condenser is fluidly coupled to a feedwater heat exchanger via a condensed feedwater conduit.

16. The system of claim 15, wherein the feedwater heat exchanger is fluidly coupled with the direct steam generator via a return feedwater conduit and is configured to heat water from the spent steam condenser.

17. The system of claim 13, further comprising an oxygen generator fluidly coupled to the direct steam generator via an air conduit.

* * * * *